Patented Apr. 12, 1927.

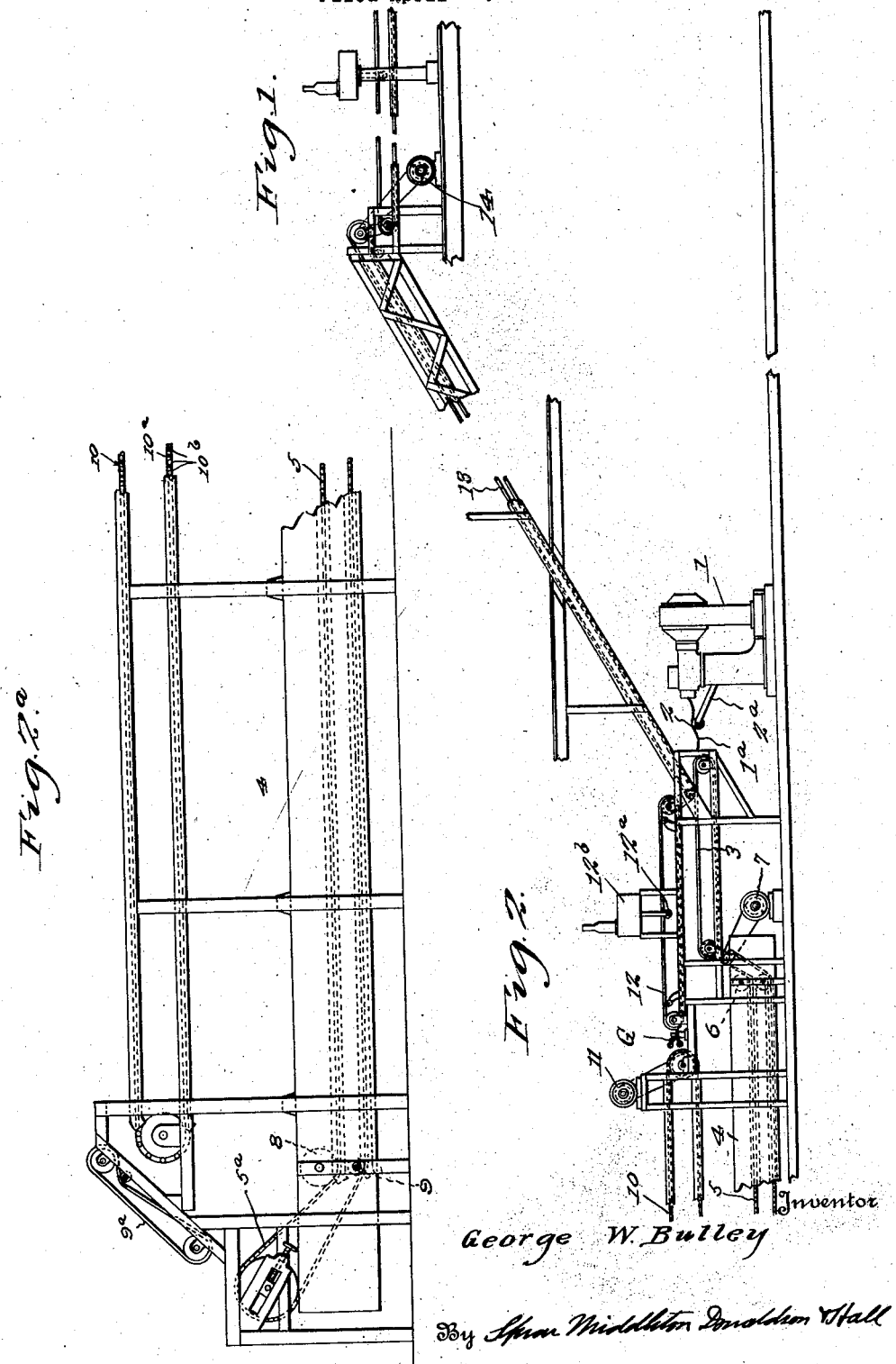

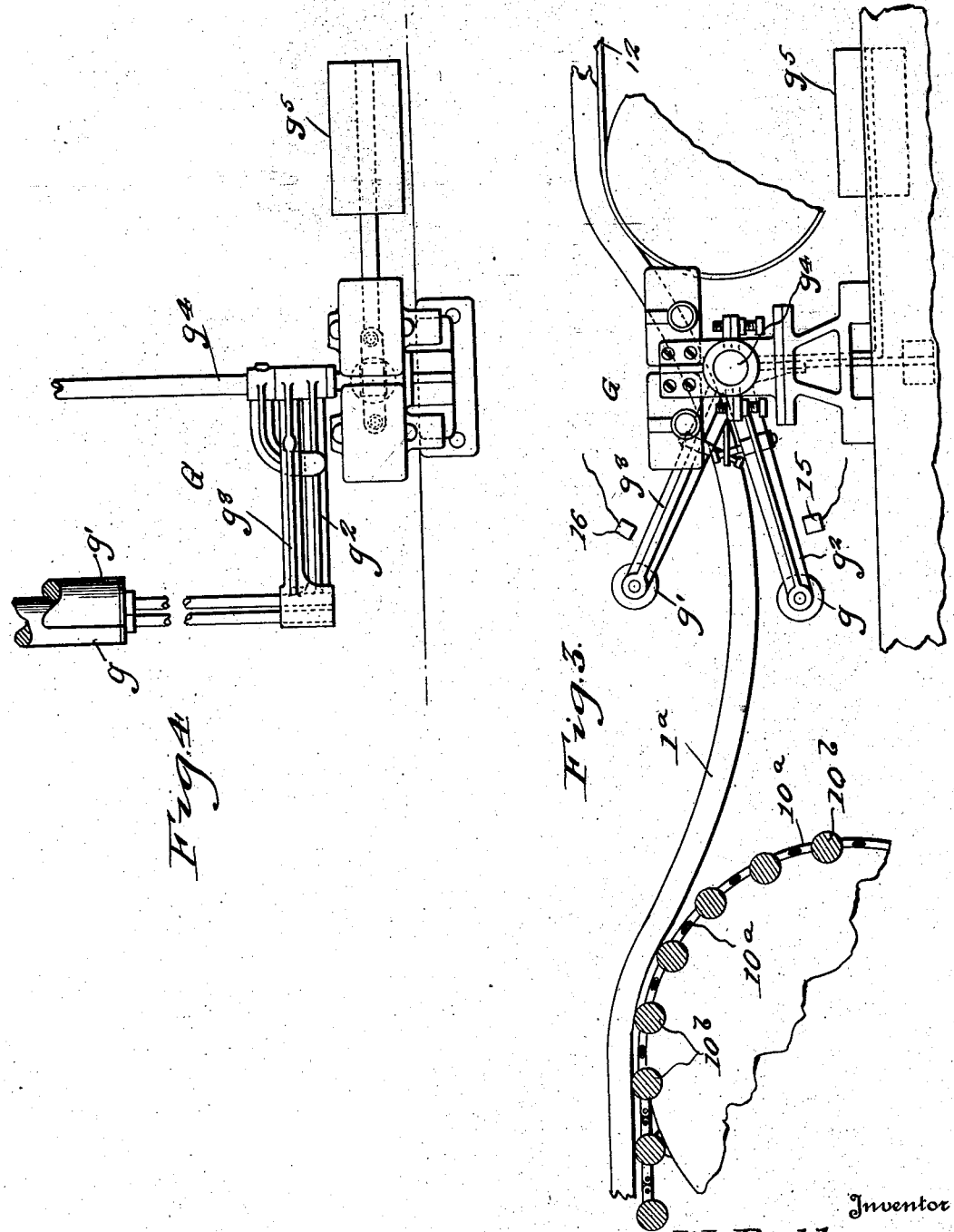

1,624,826

UNITED STATES PATENT OFFICE.

GEORGE W. BULLEY, OF AKRON, OHIO, ASSIGNOR TO THE MILLER RUBBER COMPANY, OF AKRON, OHIO, A CORPORATION OF OHIO.

SYSTEM OF MAKING TREADS.

Application filed April 22, 1926. Serial No. 103,799.

My present invention relates to an improved method of, and apparatus for forming slab rubber in a continuous length capable of being subsequently cut up into sections for various uses, such for example as for tread strips for pneumatic tires, and cushion tire strips.

Heretofore the general practice has been to form the slabs by die expressing from or by an extruding machine usually known as a tube machine, the die thereof being adjustable to produce a slab of the proper shape, and, the stock being gauged, to thereafter cut the slab into proper lengths which are booked between fabric sheets and allowed to cool. When cooled on such a flat surface shrinkage tends to take place which, due to frictional contact with the supporting surface, is restricted largely to the end portions which results in a thickening or distortion of the ends which were cut off and re-run in the extruding machine.

The present invention aims to provide a process and apparatus by which the rubber compound may be extruded, cooled and shrunk in a continuous length and conveyed in this manner to the point of use where it may be cut up into the precise lengths needed, whereby improved and more uniform slabs are produced in a more rapid and economical manner and without trimming and reworking any of the rubber.

With these and other objects in view, the invention includes the novel method and apparatus hereinafter described and defined by the appended claims.

Apparatus according to said invention and designed to carry out the method is illustrated in the accompanying drawings in which:—

Figure 1 is a conventional side elevation of one end portion of my improved apparatus.

Figure 2 is an enlarged view of the left hand portion of Figure 1 on a larger scale.

Figure 2ª is a similar view of the remaining portion omitted from Fig. 1.

Figures 3 and 4 are respectively a side elevation and a plan, partly broken away, showing the automatic slack control speed regulating device.

Referring by reference characters to this drawing, the numeral 1 designates an extruding or tube machine, which, as it may be of the ordinary or any desired construction, is only conventionally shown. The slab of rubber compound issuing therefrom, of the desired shape in cross section determined by the customary adjustable die opening, is indicated at 1ª.

After leaving the die opening the slab passes over an idle supporting roller 2 journaled a fixed support such as bracket 2ª and thence to the upper flight of an endless conveyor 3, the delivery end of which is located above the initial end of a water tank 4. This endless conveyor, being of the customary belt form, is shown only in a conventional manner.

From the delivery end of conveyor 3 the slab is led to the upper flight of what may be termed the water cooling conveyor, this comprising an endless slatted conveyor 5; to wit, endless flexible elements carrying transverse slats which support the rubber slab while giving the water free access to the entire upper surface and sides and to the bottom at spaced intervals. The slab in passing to the conveyor 5 is led under an idle depressing roller 6, and said slab remains in place upon the upper flight of the conveyor 5, due to the fact that it is of slightly greater specific gravity than the water. Conveyors 3 and 5 are driven at approximately the speed of the extruding machine by a motor 7 through suitable belt gearing, as conventionally shown, the speed of the motor being controlled by the customary means (not shown).

Where it is desired to impart some stretch to the slab the motor can, of course, be driven at a slightly greater speed.

The length of the water tank and speed of travel of the cooling conveyor therein are so proportioned or coordinated that the slab is only partially cooled by the water, as I have found that if completely cooled in water there is a tendency for the rubber to bloom.

Shrinkage of the stock takes place in the water, due to cooling, but as the slab is in a continuous length the shrinkage is evenly distributed, there are no ends capable of thickening, and there is no distortion of the rubber resulting from its contact with the cross bars of the conveyor while shrinking due to the light contact therewith.

At the delivery end of the water cooling conveyor, the slab passes under an idle roller 8, the cooling conveyor having an elevating portion 5ᵃ passing upward from the guide rollers 8 and 9 into proximity to a short elevating conveyor 9ᵃ which latter delivers the slab to the enless air cooling conveyor 10.

Conveyors 9ᵃ and 10 are driven by a motor (electric) 11 through suitable driving connections such as chain and sprocket indicated conventionally. Conveyor 9ᵃ is driven from the sheave shaft at the left hand end of conveyor 10, or in other words is driven from conveyor 10 and at an equal rate of speed.

The air cooling conveyor comprises a pair of endless elements such as chains 10ᵃ carrying a plurality of spaced rollers 10ᵇ which support the stock, but permit free movement thereof in shrinking, on which conveyor the stock is further cooled, the cooling thereon being more slowly effected than is the preliminary water cooling, and the rollers allowing the stock to shrink uniformly throughout its entire extent, it being understood that after leaving the air cooling conveyor the stock is delivered to a continuous weighing device such as the Toledo, which comprises an endless belt 12, the central portion of which passes over a roller 12ᵃ which is suspended from the scale apparatus 12ᵇ by which any deviations in the weight of the stock passing over the conveyor 12 will be indicated.

The weighing conveyor delivers the stock to an elevating conveyor 13 which delivers it to an upper floor where it is cut into suitable lengths ready for use.

Preferably the conveyors 10 and 12 are located directly above the conveyors 3 and 5, whereby floor space is saved and manipulation facilitated.

The weighing conveyor 12 and final elevating conveyor 13 are driven from a motor 14, the speed of which is controlled by an automatic speed regulator G. This comprises a pair of spaced anti-friction rollers $g$ and $g'$, journaled in the ends of the diverging pairs of arms of a swing frame $g^2$ and $g^3$, fast on rock shaft $g^4$, which is provided with a counterweight $g^5$ tending to hold the rollers in the position shown in Fig. 2. The stock is passed between the rollers $g$ and $g'$ and it will be seen that if conveyor 12 is running too slow relative to conveyor 10 the accumulation of slack will cause the stock to depress roller $g$ thereby closing a circuit at 15 which operates a motor control of say the Cutler Hammer type, to speed up the motor 10. Conversely, if the conveyor 12 is running too fast, the slack will be taken up and will lift roller $g'$ closing another set of contacts, at 16 which will slow down the motor. As the type of electric motor control referred to is well understood by those skilled in the art, illustration and description thereof is deemed unnecessary. It suffices to say that it is customarily effected by push buttons, but in place of these I use the circuit closers 15 and 16 operated by the swinging frames $g^2$ and $g^3$.

By reason of this automatic control effected by the slack of the stock, the slab is conveyed over the weighing conveyor and to the desired remote point without any tension being applied to the portion sustained by the air drying conveyor and hence without interfering with the free shrinkage of the material thereon.

Having thus described my invention, what I claim is:—

1. The hereindescribed method of producing slab rubber in a continuous length, which consists in continuously producing a slab of rubber compound by die expressing, passing the same continuously through a water bath to rapidly partially cool the same, and thereafter more slowly cooling it while continuing the motion of the slab and permitting the stock to shrink freely and uniformly throughout its length.

2. The herein described method which consists in continuously extruding a slab of rubber compound, passing the same continuously through a water bath and rapidly partially cooling the same therein, thereafter more slowly cooling it while continuing the motion of the slab and permitting the stock to shrink freely and uniformly throughout its length, and thereafter conveying the slab to a remote point and subjecting it to a progressive weighing action during such travel while maintaining the portion subjected to slow cooling free from tension.

3. In a system of, or apparatus for, producing a rubber slab, an extruding machine, a tank for cooling liquid, with means for passing the slab in continuous length therethrough, and an endless air cooling conveyor receiving the stock from said tank of a length to permit substantially complete shrinkage and having rollers to permit free shrinkage throughout the full extent thereof.

4. In a system of or apparatus for producing rubber in continuous slab form, an extruding machine, a tank for a cooling liquid, an endless conveyor submerged in the liquid of the tank and receiving the slab from said extruding machine, an endless air cooling conveyor arranged to receive the stock from said first named conveyor, said air drying conveyor having anti-friction stock supporting means to permit free shrikage of the stock thereon, means for driving said conveyors in unison with the extruding machine, means for conveying the slab from said air drying conveyor to a remote point including a weighing conveyor, a motor for said conveying means, and means controlled by the amount of slack at the delivery end of the air drying conveyor whereby the stock on the air drying conveyor is kept free from tension.

5. In a system of or apparatus for producing rubber in continuous slab form, an extruding machine, a tank for a cooling liquid, an endless conveyor submerged in the liquid of the tank and receiving the slab from said extruding machine, an endless air cooling conveyor arranged to receive the stock from said first named conveyor, said air drying conveyor having anti-friction stock supporting means to permit free shrinkage of the stock thereon, means for driving said conveyors in unison with the extruding machine, means for conveying the slab from said air drying conveyor to a remote point including a weighing conveyor, a motor for said conveying means, and means controlled by the amount of slack at the delivery end of the air drying conveyor whereby the stock on the air drying conveyor is kept free from tension, said means comprising a pair of spaced and independently bodily movable rolls between which the slab passes and from both of which it is normally free from contact.

In testimony whereof, I affix my signature.

GEORGE W. BULLEY.